US009637316B2

(12) United States Patent
Kukka

(10) Patent No.: US 9,637,316 B2
(45) Date of Patent: May 2, 2017

(54) AUGER FEEDER OF CONCRETE MIX AND METHOD OF MANUFACTURING AN AUGER FEEDER

(71) Applicant: Elematic Oyj, Akaa (FI)

(72) Inventor: Tapio Kukka, Lempäälä (FI)

(73) Assignee: Elematic Oyj, Akaa (FI)

( * ) Notice: Subject to any disclaimer, the term of this patent is extended or adjusted under 35 U.S.C. 154(b) by 0 days.

(21) Appl. No.: 15/185,048

(22) Filed: Jun. 17, 2016

(65) Prior Publication Data

US 2016/0368714 A1    Dec. 22, 2016

(30) Foreign Application Priority Data

Jun. 17, 2015 (FI) .................................... 20155469

(51) Int. Cl.
| | |
|---|---|
| *B65G 33/14* | (2006.01) |
| *B22D 19/04* | (2006.01) |
| *B28B 3/22* | (2006.01) |
| *B30B 11/24* | (2006.01) |
| *B22D 19/00* | (2006.01) |
| *B22D 25/02* | (2006.01) |

(52) U.S. Cl.
CPC ............ *B65G 33/14* (2013.01); *B22D 19/04* (2013.01); *B28B 3/222* (2013.01); *B30B 11/246* (2013.01); *B22D 19/00* (2013.01); *B22D 25/02* (2013.01); *B65G 2207/24* (2013.01); *B65G 2812/0511* (2013.01); *B65G 2812/0577* (2013.01)

(58) Field of Classification Search
CPC ........ B65G 33/14; B22D 19/00; B22D 19/06; B22D 19/045; B22D 19/24; B22D 25/02; B22D 25/005

USPC ............ 198/672, 677, 678; 29/527.1, 527.2, 29/527.3, 527.5; 425/62, 92, 207, 461

See application file for complete search history.

(56) References Cited

U.S. PATENT DOCUMENTS 3,963,116 A    6/1976 Rautia et al.
3,998,318 A    12/1976 McAlarney

FOREIGN PATENT DOCUMENTS

| DE | 202007008072 U1 | 10/2008 |
|---|---|---|
| EP | 339961 A1 | 11/1989 |
| EP | 2239118 B1 | 7/2013 |
| JP | 05077308 A | 3/1993 |

(Continued)

OTHER PUBLICATIONS

European Patent Office, Search report of patent application EP16170370.7 dated Dec. 1, 2016.

(Continued)

*Primary Examiner* — Gene Crawford
*Assistant Examiner* — Lester Rushin
(74) *Attorney, Agent, or Firm* — Berggren, Inc.

(57) ABSTRACT

The invention relates to an auger feeder of concrete mix having a helical segment, which auger feeder has at least one insert (22), which is manufactured of material that is softer than that used for manufacturing the auger feeder's helical segment. One insert (22) is mounted on a downstream end of the auger feeder. The invention also relates to a method of manufacturing an auger feeder, which method includes manufacture of a helical segment of the auger feeder, in which method at least one insert is manufactured from a material softer than that used for the auger feeder's helical segment. The insert (22) is to be mounted on a downstream end of the auger feeder of the casting of the auger feeder's helical segment.

9 Claims, 4 Drawing Sheets

(56) References Cited

FOREIGN PATENT DOCUMENTS

SE         447358 B    11/1986
WO     9936236 A1    7/1999

OTHER PUBLICATIONS

Finnish Patent and Registration Office, Search report of patent application FI20155469 dated Dec. 2012.

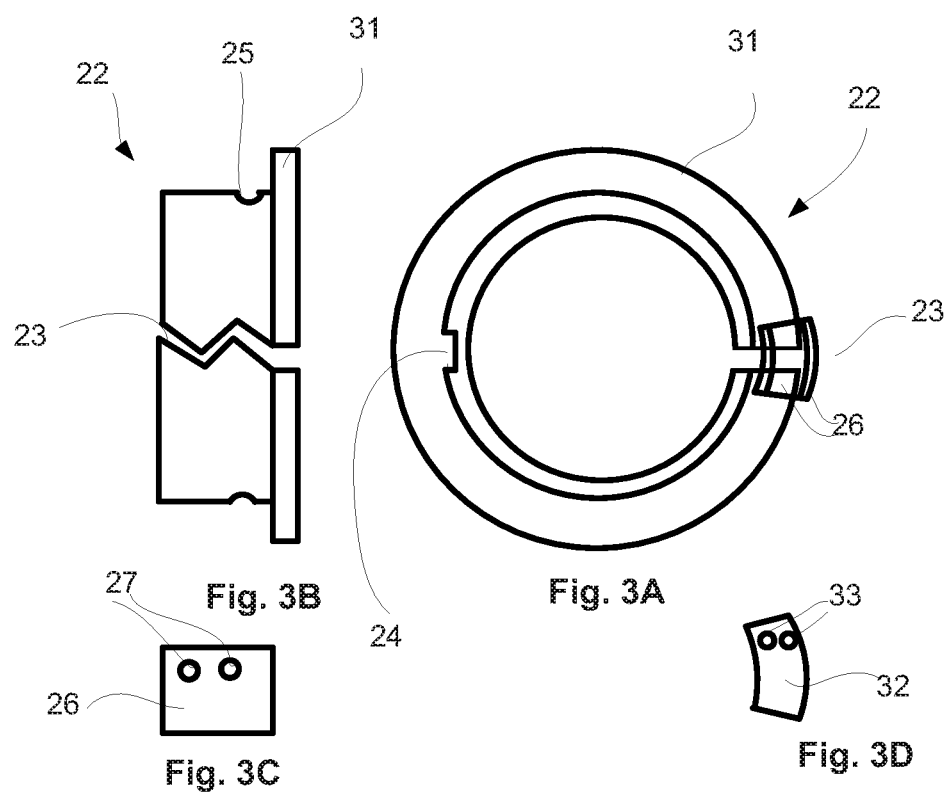

AUGER FEEDER OF CONCRETE MIX AND METHOD OF MANUFACTURING AN AUGER FEEDER

FIELD OF INVENTION

The invention relates to an auger feeder of concrete mix and to a method of manufacturing an auger feeder. Especially the invention relates to an auger feeder according to the preamble of the independent auger feeder claim and to a method according to the independent method claim.

BACKGROUND OF THE INVENTION

As known from the prior art process of casting concrete products by extruder type extruding involves feeding concrete mass from the concrete mass hopper of a extruder on top of auger feeders, said auger feeders conveying concrete mass under pressure into a delimited cross-section established by a casting bed, sidewalls advancing along with the casting machine, together with a levelling beam defining the top surface of a product being cast, i.e. into a extruder mold. The extruder mold defines a product to be cast in terms of its cross-sectional shape. The concrete mix under pressure, fed into a extruder mold, is compacted for example by a levelling and/or reciprocating motion of the sidewalls and the levelling beam, as well as by a reciprocating motion of the auger feeder in addition to a rotary motion of the auger feeder responsible for feeding the mass. In the process of casting concrete products with hollow cores by extruding, behind the auger feeders is added hollow-core forming members or hollow-core mandrels. As extruding progresses, the extruder advances along a casting bed in response to a reaction force resulting from the feeding of concrete mass by the auger feeders, which advancement of the extruder can be accelerated or decelerated as necessary by means of a drive motor of the extruder apparatus. As the extruder advances, the cast product remains on the casting bed for hardening and curing prior to its possible cutting for defined-length blocks and replacement to storage.

Auger feeders can also be used in extruder types other than extruder types, where the auger feeders can enhance the feeding of concrete mix, for example at a specific feeding stage.

At present, auger feeders are usually attached by way of flanges fixed to a shaft rotating the auger feeder and to the auger feeders. These flanges are fastened to each other by screws extending through unthreaded holes existing in the flanges. An established approach with these attachments is to weld the screw heads securely to the flange in an effort to ensure the durability of the auger feeder attachment in use.

In EP patent publication 2239118 B1 (corresponding FI patent publication 121656 B) is disclosed an auger feeder for concrete mix, comprising a helical segment, which auger feeder comprises an insert mounted on an upstream end of the auger feeder, said insert being manufactured in a material softer than that used for manufacturing the auger feeder's helical segment, and said insert comprising means for fastening the auger feeder to a casting apparatus, which the auger feeder comprises a cast infill cast at least partially over the insert. The downstream end of this know auger feeder has been manufactured as a continuous part of the auger feeder's helical segment of same material, typically of white cast iron, which has good hardness and abrasion resistance but is hard and brittle, thus very difficult to manufacture by chip removing techniques, which has made the manufacturing of the auger feeder slow and costly as a bearing housing is needed at this downstream end of the auger feeder, which is under high abrasive wear and thus very high hardness and abrasion resistance properties are needed.

In FI patent publication 50587 C is disclosed an auger feeder, in which inserts are mounted on a downstream end of the auger feeder.

SUMMARY OF THE INVENTION

One object of the invention is to create an auger feeder in which the disadvantages and problems of the auger feeders according to prior art are eliminated or at least minimized.

One object of the invention is to further develop auger feeders of concrete mix, methods of manufacturing auger feeders.

According to aspects of the invention the auger feeder of concrete mix comprises a helical segment, which auger feeder comprises at least one insert, which is manufactured of material that is softer than that used for manufacturing the auger feeder's helical segment, and one insert is mounted on a downstream end of the auger feeder. Thus manufacturing of the auger feeder is faster than manufacturing of from prior art know auger feeders and simultaneously cost savings are achieved.

According to an advantageous feature the auger feeder comprises two inserts and one insert is mounted on an upstream end of the auger feeder and one insert is mounted on a downstream end of the auger feeder. By this feature the manufacturing of the auger feeder is even more efficient and cost saving.

According to aspects of the invention the insert of the auger feeder is annular and comprises a gap cutting the annular shape in cross direction and a cover plate is provided to cover at least part of the outer surface of the circumference of the insert at the area of the gap. Advantageously the cover plate extends at least partially over the gap area. According to an advantageous feature the gap width is 1.5-2.5 mm so that shrinkage of cast of the helical segment/auger feeder during casting is allowed and cracks in the casted product can be avoided.

According to an advantageous feature the insert comprises at least one locking groove by which the movement of the insert during casting is prevented. Advantageously the locking groove is located on the outer circumference of the insert.

According to an advantageous feature the auger feeder comprises a cast infill cast at least partially cover the insert.

According to an advantageous feature the insert to be mounted on the downstream end of the auger feeder is made of soft material and its hardness is advantageously 40-60 HRC. Thus a very good hardness and abrasion resistance properties are achieved for the insert.

According to an advantageous feature the helical part of the auger feeder has hardness over 60 HRC, advantageously over 80 HRC.

According to aspects of the invention the method of manufacturing an auger feeder comprises manufacture of a helical segment of the auger feeder, in which method at least one insert is manufactured from a material softer than that used for the auger feeder's helical segment, and the insert is to be mounted on an downstream end of the auger feeder of the casting of the auger feeder's helical segment.

According to aspects of the invention at least the one insert is set into the cast mold of the auger feeder before casting the helical part of the auger feeder.

By the auger feeder according to aspects of the invention and its advantageous features many advantages are achieved, for example manufacturing of the auger feeder is easier and the helical part, most susceptible of wear, can be made of even harder material than is used in prior art solutions.

In the following the invention is described in detail with reference to the accompanying drawings.

BRIEF DESCRIPTION OF DRAWINGS

FIGS. 3A-3D schematically show another advantageous example of the insert.

During the course of this description like numbers and signs will be used to identify like elements according to the different views which illustrate the invention.

DETAILED DESCRIPTION OF EXEMPLARY EMBODIMENTS

Figure 1:
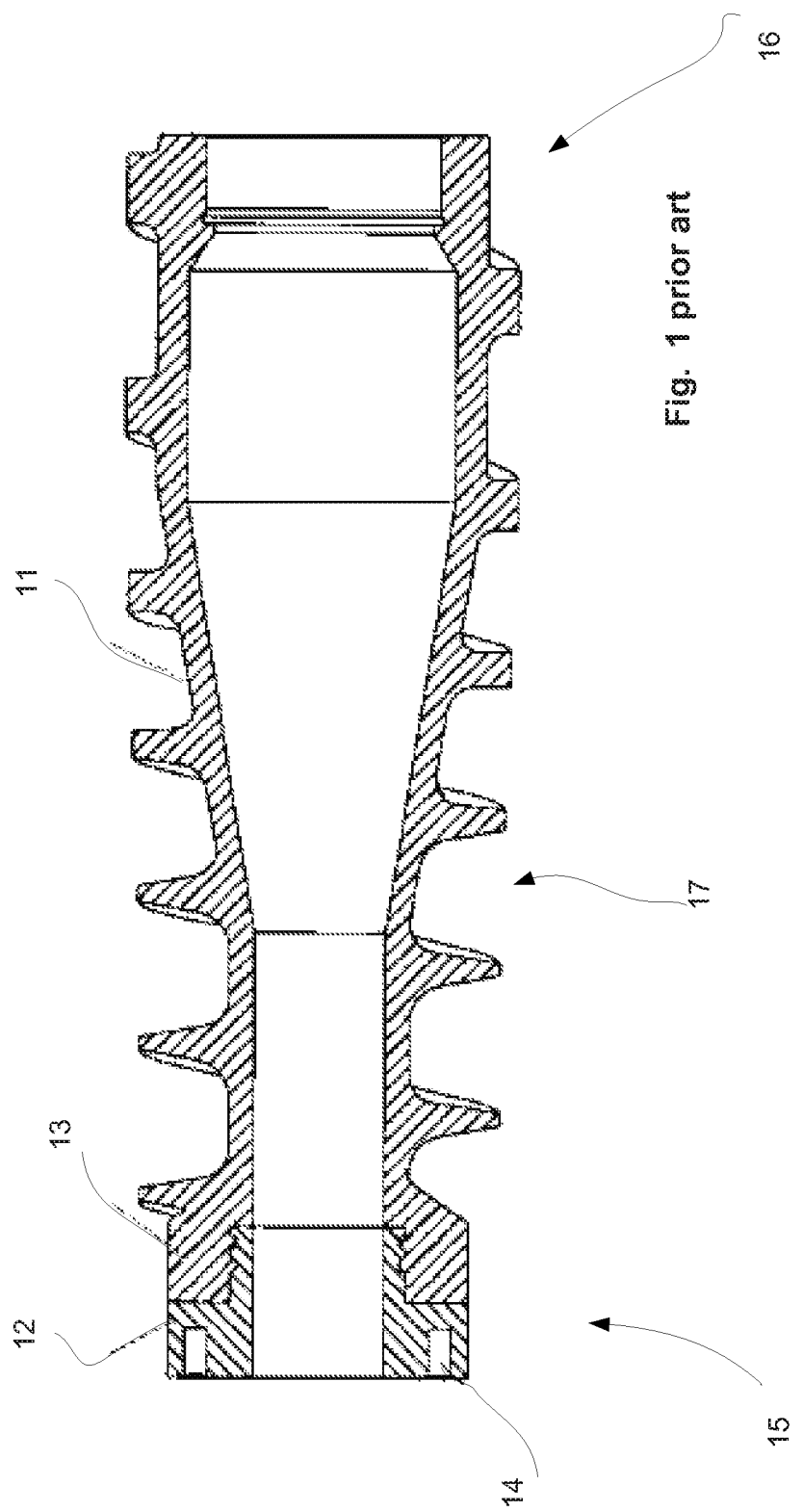
FIG. 1 schematically shows one example of a auger feeder according to prior art.
Figures 2A, 2B, 2C, 2D:
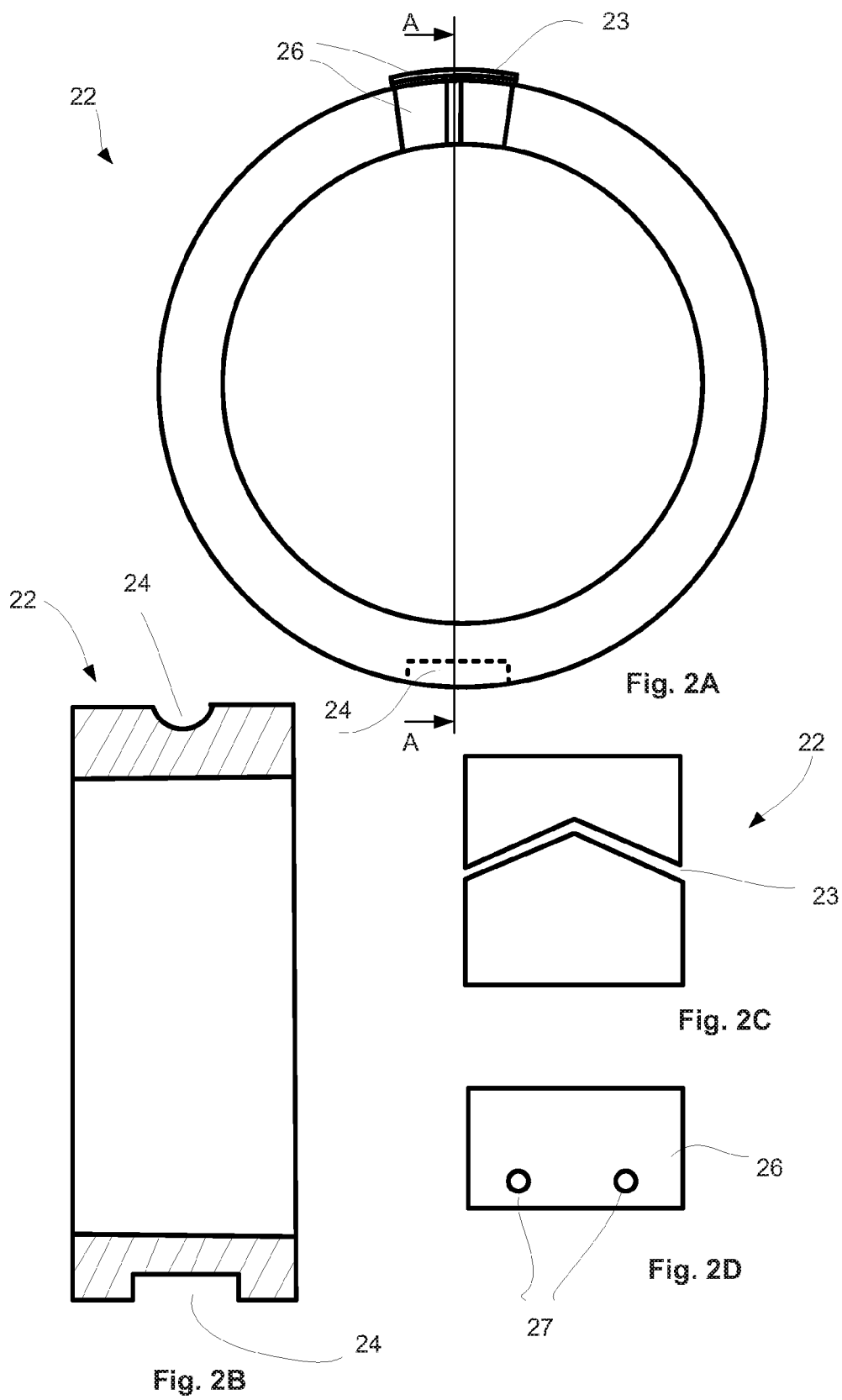
FIGS. 2A-2D schematically show an advantageous example of the insert.

In FIG. 1 is schematically shown an example of a auger feeder according to an example of prior art, which auger feeder 11 in the figures comprises an insert 12, and an infill cast 13 covering at least a part of the insert. The insert 12 is attached to the upstream end 15 of the actual auger feeder 11, i.e. of a helical segment 17 of the auger feeder, by which upstream end the auger feeder attachment to a casting machine takes place. The insert 12 is formed with threaded fastening holes 14. The auger feeder is fastened with screws to a flange fixed to an auger-driving shaft, the heads of said screws remaining on the side of the attachment flange. In the area of a joint between the insert 12 and the auger feeder 11, at least partially on top of the insert 12, is preferably added a cast infill 13, said cast infill securing the insert mechanically in place, as well as protecting the insert 12, along with other components of the casting apparatus, from the abrading action of concrete mix. This cast infill 13 is preferably produced at the same time as the auger feeder 21 is cast and from the same material as the auger feeder. Downstream end 16 of the auger feeder 11 is of same piece as the helical segment 17 of the auger feeder 11 and of same material, typically of white cast iron.

In the example of the FIGS. 2A-2D is shown the insert 22 of the auger feeder. The insert 22 an annular shape with a gap 23 allowing to shrinkage of cast of the helical segment/auger feeder during casting and cracks in the casted product can be avoided. The gap 23 extends over the insert 22 cutting the annular shape. In the figure the gap 23 has a V-shape but also other shapes; curved or straight shapes can be used. Advantageously the width of the gap is 1.5-2.5 mm. The insert 22 also comprises at least one locking groove 24 by which the movement of the insert 22 during casting is prevented. The form of the locking groove 24 can vary around circumference of the insert 22 or its form may remain same around the circumference of the insert 22. A cover plate 26 with fastening holes 27 is provided to cover the outer surface of the circumference of the insert 22 at the area of the gap 23 during casting. The cover plate 26 extends on at least partially over the gap area.

In the example of the FIGS. 3A-3D is shown the insert 22 of the auger feeder with a flange 31. The insert 22 an annular shape with a gap 23 allowing the allowing to shrinkage of cast of the helical segment/auger feeder during casting and cracks in the casted product can be avoided. In the figure the gap 23 has a sharp S-shape but also other shapes; curved or straight or V-shapes can be used. The gap 23 extends over the insert 22 cutting the annular shape. Advantageously the width of the gap is 1.5-2.5 mm. The insert 22 also comprises at least one locking groove 24 by which the movement of the insert 22 during casting is prevented. The form of the locking groove 24 can vary around circumference of the insert 22 or its form may remain same around the circumference of the insert 22. A cover plate 26 with fastening holes 27 is provided to cover the outer surface of the circumference of the insert 22 at the area of the gap 23 during casting. The cover plate 26 extends on at least partially over the gap area. A cover piece 32 with fastening holes 33 is provided to cover the outer surface of the circumference of the flange 31 of the insert 22 at the area of the gap 23 during casting.

Figure 4A:
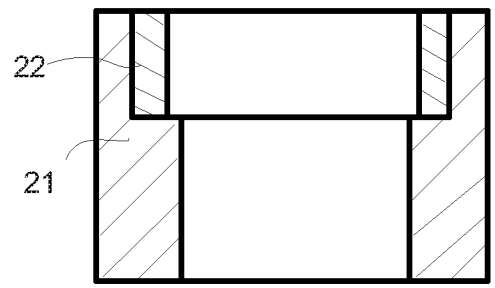
FIGS. 4A-4C schematically show advantageous examples of attachment of the insert to the end of the auger feeder.
Figure 4B:
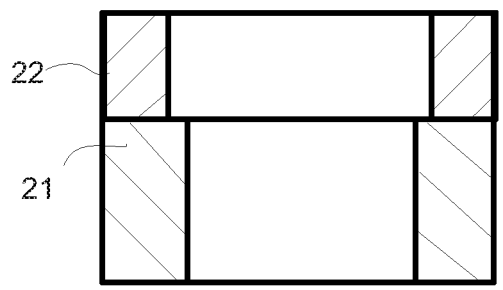
Figure 4C:
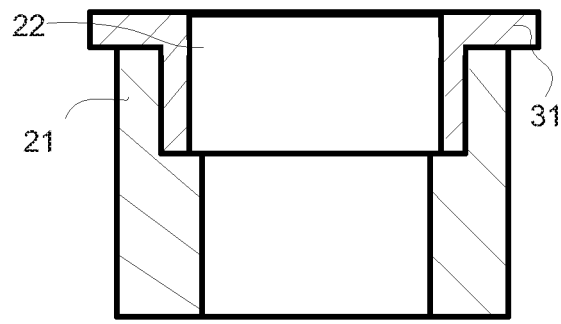

In FIGS. 4A-4C is shown advantageous examples of attachment of the insert 22 to the end of the auger feeder 21. The insert 22 is attached to the downstream end 16 of the auger feeder by screwed coupling (not shown). In FIG. 4A is shown an example of embedded attachment. In FIG. 4B is shown an example of end to end attachment. In FIG. 4C is shown an example of embedded attachment of an insert 22 with flange 31.

Figure 5:
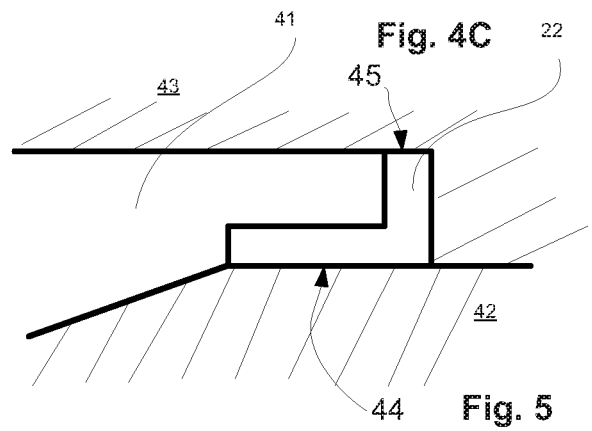
FIG. 5 schematically shows an advantageous example of casting the auger feeder.

As shown in FIG. 5, when manufacturing the auger feeder, the insert 22 is set into the cast mold 43 of the auger feeder before casting the other parts, for example the helical part of the auger feeder of the cast melt 41. Also a kernel 42 is used in casting for creating the inner parts of the auger feeder. In the figure surface 44 and if required surface 45 will be finished after casting the auger feeder by chip removing machining.

The insert 22 is made of a material which is softer than the manufacturing material of the auger feeder 21. The softer material of the insert 22 enables machining of the bearing housing and an attachment surface to the insert 22 required for machining the entity formed by the auger feeder 21 and the insert 22. The softer material of the insert 22 also enables working and finishing of the surfaces needed in the alignment and attachment of the auger feeder 21. The insert 22 to be mounted on the downstream end of the auger feeder is advantageously made of soft material and its hardness is advantageously 40-60 HRC. Advantageously the helical part of the auger feeder has hardness over 60 HRC, advantageously over 80 HRC.

REFERENCE SIGNS USED IN THE DRAWING 11 auger feeder
12 insert
13 cast infill
14 fastening holes
15 upstream end
16 downstream end
17 helical segment
21 auger feeder
22 insert
23 gap
24 locking groove
26 cover plate
27 fastening holes
31 flange
32 cover piece
33 fastening holes
41 cast melt 42 kernel
43 mold
44 surface
45 surface

The invention claimed is:

1. An auger feeder for concrete mix, said auger feeder comprising:
   a cast helical segment,
   at least one annular insert mounted on a downstream end of the auger feeder, the annular insert having a gap cutting the annular shape in a cross direction, wherein the annular insert is manufactured of material that is softer than that used for manufacturing the cast helical segment, and wherein the annular insert is set into a cast mold of the auger feeder before casting the helical segment, and
   a cover plate covering at least part of an outer surface of a circumference of the annular insert at the area of the gap.

2. The auger feeder according to claim 1, further comprising a second insert mounted on an upstream end of the auger feeder.

3. The auger feeder according to claim 1, wherein the cover plate extends at least partially over the gap of the annular insert.

4. The auger feeder according to claim 1, wherein the annular insert includes at least one locking groove which is capable of preventing movement of the annular insert during casting.

5. The auger feeder according to claim 4, wherein the locking groove is located on an outer circumference of the annular insert.

6. The auger according to claim 1, further comprising a cast infill which is cast at least partially over the annular insert.

7. A method of manufacturing an auger feeder comprising;
   a setting at least one annular insert having a gap into a cast mold for the auger feeder before casting a helical art of the auger feeder, wherein the insert is mounted on a downstream end of the auger feeder
   casting a helical segment of the auger feeder in the cast mold, wherein the helical segment is cast from a material which is harder than the at least one insert.

8. The method of claim 7, further comprising using a locking groove of the at least one insert to prevent movement of the insert during casting.

9. The method of claim 7, further comprising casting an infill at least partially over the insert.

* * * * *